(12) United States Patent
Erigican et al.

(10) Patent No.: US 9,610,551 B2
(45) Date of Patent: Apr. 4, 2017

(54) FLOW COMPENSATOR

(71) Applicant: apiqe inc, Torrance, CA (US)

(72) Inventors: Erdogan Erigican, Torrance, CA (US); Jing Huang, Los Angeles, CA (US)

(73) Assignee: Apiqe Holdings, LLC, Torrance, CA (US)

( * ) Notice: Subject to any disclaimer, the term of this patent is extended or adjusted under 35 U.S.C. 154(b) by 49 days.

(21) Appl. No.: 14/138,831

(22) Filed: Dec. 23, 2013

(65) Prior Publication Data
US 2014/0239519 A1    Aug. 28, 2014

Related U.S. Application Data

(63) Continuation of application No. PCT/US2012/043708, filed on Jun. 22, 2012.
(Continued)

(51) Int. Cl.
| | | |
|---|---|---|
| B01F 3/04 | (2006.01) |
| B01F 5/06 | (2006.01) |
| A23L 2/54 | (2006.01) |

(52) U.S. Cl.
CPC .............. *B01F 3/0451* (2013.01); *A23L 2/54* (2013.01); *B01F 3/04503* (2013.01);
(Continued)

(58) Field of Classification Search
CPC ...... A23L 2/54; B01F 3/04503; B01F 3/0451; B01F 3/04787; B01F 5/0665; B01F 5/0679; B67D 1/0016; B67D 1/0059; B67D 1/127; B67D 1/1272; B67D 1/1411; B67D 1/1422; B67D 2001/1494; B67D 2210/00052
(Continued)

(56) References Cited

U.S. PATENT DOCUMENTS

| | | | |
|---|---|---|---|
| 1,029,236 A | | 6/1912 | Shattuck et al. |
| 2,162,842 A | * | 6/1939 | Dolison ............... B67D 1/0802 |
| | | | 137/12.5 |

(Continued)

FOREIGN PATENT DOCUMENTS

| | | |
|---|---|---|
| CN | 1277594 A | 12/2000 |
| CN | 1914123 A | 2/2007 |

(Continued)

OTHER PUBLICATIONS

Chinese Office Action in CN Appl. Ser. No. 201180033123.X dated Nov. 30, 2014.
(Continued)

*Primary Examiner* — Charles Bushey
(74) *Attorney, Agent, or Firm* — Foley & Lardner LLP; James De Vellis

(57) ABSTRACT

An apparatus is disclosed including: a housing including a conduit having an inlet port and an outlet port; an insert at least partially disposed within the conduit and including a tapered portion extending from a narrower end proximal the inlet port to a wider end distal the inlet port; and a facility for adjusting the position of the insert within the conduit. In some embodiments, the apparatus is configured to receive a mixed flow of liquid and gas at the inlet port, direct the mixed flow through the conduit around a portion of the insert disposed within the chamber, and outlet the mixed flow at the outlet port.

20 Claims, 17 Drawing Sheets

Related U.S. Application Data

(60) Provisional application No. 61/500,461, filed on Jun. 23, 2011.

(52) U.S. Cl.
CPC ........ B01F 3/04787 (2013.01); B01F 5/0665 (2013.01); B01F 5/0679 (2013.01)

(58) Field of Classification Search
USPC ...... 261/76, 108, 110, DIG. 7; 222/509, 518
See application file for complete search history.

(56) References Cited

U.S. PATENT DOCUMENTS

| | | | |
|---|---|---|---|
| 2,173,979 A * | 9/1939 | Picut | B67D 1/12 |
| | | | 138/46 |
| 2,271,982 A | 2/1942 | Van Kreveld et al. | |
| 2,899,170 A * | 8/1959 | Cornelius | B67D 1/1466 |
| | | | 137/600 |
| 2,924,238 A * | 2/1960 | Cornelius | B67D 1/1416 |
| | | | 137/600 |
| 3,502,111 A * | 3/1970 | Hansen | B67D 1/14 |
| | | | 137/170.1 |
| 3,526,391 A | 9/1970 | Church, Jr. | |
| 3,648,984 A | 3/1972 | Mimura et al. | |
| 3,744,762 A | 7/1973 | Schlicht | |
| 3,761,066 A | 9/1973 | Wheeler | |
| 4,068,830 A | 1/1978 | Gray | |
| 4,078,578 A * | 3/1978 | Buchholz | B67D 1/1466 |
| | | | 137/269 |
| 4,081,863 A | 3/1978 | Rees | |
| 4,087,862 A | 5/1978 | Tsien | |
| 4,124,309 A | 11/1978 | Yao | |
| 4,271,992 A * | 6/1981 | Becker | B67D 1/1466 |
| | | | 138/40 |
| 4,695,378 A | 9/1987 | Ackman et al. | |
| 4,753,535 A | 6/1988 | King | |
| 4,783,319 A | 11/1988 | Habrich et al. | |
| 4,940,164 A | 7/1990 | Hancock et al. | |
| 5,033,651 A | 7/1991 | Whigham et al. | |
| 5,050,806 A * | 9/1991 | Anderson | B67D 1/0829 |
| | | | 222/394 |
| 5,064,097 A | 11/1991 | Brog et al. | |
| 5,192,513 A | 3/1993 | Stumphauzer et al. | |
| 5,473,909 A | 12/1995 | Kateman et al. | |
| 5,510,060 A | 4/1996 | Knoll | |
| 5,538,028 A * | 7/1996 | Lombardo | B67D 1/0456 |
| | | | 137/12.5 |
| 5,842,600 A | 12/1998 | Singleterry et al. | |
| 5,934,328 A | 8/1999 | Conrad et al. | |
| 6,041,970 A | 3/2000 | Vogel | |
| 6,060,092 A | 5/2000 | Oesterwind et al. | |
| 6,120,685 A | 9/2000 | Carlson et al. | |
| 6,253,963 B1 | 7/2001 | Tachibana | |
| 6,669,238 B1 | 12/2003 | Santy, Jr. | |
| 7,048,148 B2 | 5/2006 | Roekens et al. | |
| 7,059,591 B2 | 6/2006 | Bortkevitch et al. | |
| 7,338,551 B2 | 3/2008 | Kozyuk | |
| 7,445,133 B2 | 11/2008 | Ludovissie et al. | |
| 7,513,398 B2 * | 4/2009 | Miller | B67D 1/1461 |
| | | | 222/547 |
| 7,600,911 B2 | 10/2009 | Bechtold | |
| 7,815,078 B2 * | 10/2010 | Robinson | B67D 1/1416 |
| | | | 222/400.7 |
| 7,878,705 B2 | 2/2011 | Schauerte | |
| 7,913,984 B2 | 3/2011 | Noguchi et al. | |
| 8,091,737 B2 | 1/2012 | Smeller et al. | |
| 8,109,413 B2 | 2/2012 | Schroeder et al. | |
| 8,177,197 B1 | 5/2012 | Ergican | |
| 8,191,867 B2 | 6/2012 | Spiegel | |
| 8,499,978 B2 | 8/2013 | Dalchau et al. | |
| 8,567,767 B2 | 10/2013 | Fantappie | |
| 8,631,974 B2 | 1/2014 | Piatnik et al. | |
| 8,636,268 B2 | 1/2014 | Fantappie | |
| 8,960,500 B2 | 2/2015 | Van Opstal et al. | |
| 2001/0027809 A1 | 10/2001 | Guillaume et al. | |
| 2003/0080037 A1 | 5/2003 | Mazzei | |
| 2003/0080443 A1 | 5/2003 | Bosko | |
| 2004/0011710 A1 | 1/2004 | Kato et al. | |
| 2004/0251566 A1 | 12/2004 | Kozyuk | |
| 2005/0161394 A1 | 7/2005 | Fritze et al. | |
| 2006/0051448 A1 | 3/2006 | Schryver et al. | |
| 2006/0056271 A1 | 3/2006 | Kapila et al. | |
| 2006/0086136 A1 | 4/2006 | Maritan et al. | |
| 2006/0138170 A1 | 6/2006 | Brim et al. | |
| 2006/0280027 A1 | 12/2006 | Fulton | |
| 2006/0288874 A1 | 12/2006 | Ziesel | |
| 2007/0070807 A1 | 3/2007 | Bracht et al. | |
| 2007/0257378 A1 | 11/2007 | Spiegel | |
| 2009/0026637 A1 | 1/2009 | Goltenboth et al. | |
| 2009/0236277 A1 | 9/2009 | Kurth et al. | |
| 2010/0024890 A1 | 2/2010 | Romanyszyn et al. | |
| 2010/0107887 A1 | 5/2010 | Bentley et al. | |
| 2010/0133708 A1 * | 6/2010 | Fischer | B01F 3/0446 |
| | | | 261/94 |
| 2011/0316175 A1 | 12/2011 | Kumar et al. | |

FOREIGN PATENT DOCUMENTS

| | | |
|---|---|---|
| DE | 197 42 301 | 11/1998 |
| DE | 102006048456 | 4/2008 |
| EP | 1 716 918 | 11/2006 |
| EP | 2 070 586 | 6/2009 |
| EP | 2 070 587 A1 | 6/2009 |
| JP | 2001-187326 | 7/2001 |
| JP | 2001-335520 | 12/2001 |
| JP | 2005-288052 | 10/2005 |
| JP | 2007-089710 | 4/2007 |
| JP | 2008-289990 | 12/2008 |
| KR | 10-2005-0095340 | 9/2005 |
| KR | 10-2006-0003947 | 1/2006 |
| KR | 10-2006-0102726 | 9/2006 |
| KR | 10-0634782 | 10/2006 |
| TW | 200827291 | 7/2008 |
| WO | WO-99/21798 | 5/1999 |
| WO | WO-00/07707 | 2/2000 |
| WO | WO-00/25904 A1 | 5/2000 |
| WO | WO-2005/075365 | 8/2005 |
| WO | WO-2006/044346 | 4/2006 |
| WO | WO-2007/028390 | 3/2007 |
| WO | WO-2008/120076 | 10/2008 |

OTHER PUBLICATIONS

European Search Report on EP Appl. Ser. No. 12802311.6 dated Nov. 13, 2014.
International Preliminary Report on Patentability for PCT Appl. Ser. No. PCT/US2011/033709 dated Nov. 6, 2012.
International Preliminary Report on Patentability for PCT Appl. Ser. No. PCT/US2012/043708 dated Dec. 23, 2013.
International Preliminary Report on Patentability for PCT Appl. Ser. No. PCT/US2012/043797 dated Dec. 23, 2013.
International Preliminary Report on Patentability for PCT Appl. Ser. No. PCT/US2012/043873 dated Dec. 23, 2013.
International Preliminary Report on Patentability for PCT Appl. Ser. No. PCT/US2012/044041 dated Dec. 23, 2014.
International Search Report for PCT Appl. Ser. No. PCT/US2011/033709 dated Oct. 21, 2011.
International Search Report for PCT Appl. Ser. No. PCT/US2012/043708 dated Jan. 28, 2013.
International Search Report for PCT Appl. Ser. No. PCT/US2012/043797 dated Nov. 26, 2012.
International Search Report for PCT Appl. Ser. No. PCT/US2012/044041 dated Jan. 25, 2013.
Office Action in Mexican Appl. Ser. No. MX/a/2012/012838 dated Dec. 8, 2014.
Office Action in Mexican Patent Appl. Ser. No. MX/a/2012/012838 dated Apr. 22, 2014.
US Notice of Allowance in U.S. Appl. No. 12/772,641 dated Aug. 16, 2013.

(56) References Cited

OTHER PUBLICATIONS

US Notice of Allowance in U.S. Appl. No. 13/780,977 dated Oct. 15, 2013.
US Office Action in U.S. Appl. No. 12/772,641 dated Nov. 29, 2012.
US Office Action in U.S. Appl. No. 12/772,641 dated Jun. 4, 2012.
US Office Action in U.S. Appl. No. 13/780,977 dated Jun. 4, 2013.
Chinese Office Action in CN Appl. Ser. No. 201180033123.X dated Mar. 6, 2015.
Chinese Office Action in CN Appl. Ser. No. 201180033123.X dated Oct. 29, 2015.
European Search Report in Application No. 12802533.5, dated Jul. 21, 2015.
Japanese Office Action in JP Appl. Ser. No. 2013-509106 dated Mar. 16, 2015.
U.S. Office Action in U.S. Appl. No. 14/138,817, dated Oct. 15, 2015.
U.S. Office Action in U.S. Appl. No. 14/138,712, dated Aug. 13, 2015.
U.S. Office Action in U.S. Appl. No. 14/162,343, dated Oct. 30, 2015.
U.S. Office Action in U.S. Appl. No. 14/138,817 dated Mar. 26, 2015.
European Search Report received in EP Appl. No. 12802311.6 dated Mar. 17, 2016.
Office Action and Search Report for Taiwan Appl. Ser. No. 100114244 dated Feb. 5, 2016.
U.S. Notice of Allowance in U.S. Appl. No. 14/138,712, dated Dec. 4, 2015.
U.S. Office Action in U.S. Appl. No. 14/138,811, dated May 27, 2016.
European Search Report received in EP Appl. No. 12802311.6 dated Oct. 21, 2016.
U.S. Office Action on U.S. Appl. No. 14/138,811 dated Nov. 25, 2016.

* cited by examiner

FLOW COMPENSATOR

CROSS-REFERENCE TO RELATED APPLICATIONS

This application is a continuation of International Application Number PCT/US2012/043708, filed Jun. 22, 2012, which claims the benefit of U.S. Provisional Application No. 61/500,461 filed Jun. 23, 2011, the entire contents of which are incorporated by reference herein.

This application is also related to U.S. Provisional Application Nos. 61/500,451, 61/500,469, 61/500,500, 61/500,440, each filed Jun. 23, 2011, and U.S. Provisional Application No. 61/654,487, filed Jun. 1, 2012. The entire contents of each of the foregoing applications are incorporated by reference herein.

BACKGROUND

Water and carbon dioxide are generally immiscible under normal environmental conditions, i.e., room temperature and atmospheric pressure. Apparatuses and methods exist for producing carbonated water by creating conditions under which carbon dioxide will become water-soluble. Generally, carbon dioxide becomes more soluble in water as pressures increase and temperatures decrease.

In some cases carbonation devices produce an outflow of carbonated water that is more turbulent than desired. The turbulence of the flow may degrade the level of carbonation or produce a poorly controlled or inconsistent output flow rate.

In fluid mechanics, the Reynolds number is a dimensionless number that gives a measure of the ratio of inertial forces to viscous forces in a flow and consequently quantifies the relative importance of these two types of forces for given flow conditions. The Reynolds number may be used to characterize different flow regimes, such as laminar or turbulent flow. Laminar flow occurs at low Reynolds numbers, where viscous forces are dominant, and is characterized by smooth, constant fluid motion. Turbulent flow occurs at high Reynolds numbers and is dominated by inertial forces, which tend to produce chaotic eddies, vortices and other flow instabilities.

SUMMARY

The applicants have realized that a flow compensator may be provided and used to regulate the flow of carbonated water from a carbonator. The compensator may allow for adjustable control of the flow rate through the compensator, the level of carbonation, the turbulence of the flow, the flow velocity, or other flow properties.

In one aspect, an apparatus is disclosed including: a housing including a conduit having an inlet port and an outlet port; and an insert at least partially disposed within the conduit and including: a tapered portion extending from a narrower end proximal the inlet port to a wider end distal the inlet port. The apparatus also includes a facility for adjusting the position of the insert within the conduit. In some embodiments, the apparatus is configured to receive a mixed flow of liquid and gas at the inlet port, direct the mixed flow through the conduit around a portion of the insert disposed within the chamber, and outlet the mixed flow at the outlet port.

In some embodiments, the conduit includes a tubular passage extending along a longitudinal axis from a proximal end to a distal end; the inlet port includes an aperture disposed about the longitudinal axis adjacent the proximal end of the tubular passage; and the outlet port includes an aperture oriented transverse to the inlet port and adjacent the distal end of the tubular passage.

In some embodiments, the tapered portion of the insert extends along the longitudinal axis of the tubular passage and cooperates with a wall of the passage to form a conical channel between the insert and the wall. In some embodiments, a cross sectional area, taken transverse the longitudinal axis adjacent, of the conical channel is smaller than a cross sectional area, taken transverse the longitudinal axis, of a portion of the tubular passage adjacent the inlet port.

In some embodiments, where the facility for adjusting the position of the insert within the conduit is configured to adjust the cross sectional area of the conical channel.

In some embodiments, the tubular passage includes a tapered wall facing the tapered portion of the insert.

In some embodiments, the portion of the insert extending into the conduit has one or more surface features configured to interrupt or divert the mixed flow.

In some embodiments, the surface features are configured to divert at least a portion of the mixed flow towards the outlet port.

In some embodiments, the surface features are configured to reduce the velocity of at least a portion of the mixed flow in regions adjacent the features.

In some embodiments, the surface features include a plurality of protrusions from a surface of the insert.

In some embodiments, at least some of the plurality of protrusions are arranged in a first ring disposed about a longitudinal axis of the insert.

In some embodiments, at least some of the plurality of protrusions are arranged in a second ring disposed about a longitudinal axis of the insert, where the protrusions in the first ring are longitudinally offset and radially staggered from the protrusions in the second ring.

In some embodiments, the surface features include a plurality of ribs and channels.

In some embodiments, the ribs and channels extend from the wider end of the tapered portion of the insert towards and end of the insert located proximal the outlet channel.

In some embodiments, the facility includes a threaded attachment between the housing and insert.

Some embodiments include one or more seals configured to ensure that the conduit is sealed fluid tight except for the inlet and outlet ports.

In another aspect, a system is disclosed including: a carbonator having an outlet for dispensing a flow of carbonated water; and a flow compensator including the apparatus of any of the types described above. In some embodiments, the outlet of the carbonator is in fluid communication with the inlet port of the flow compensator.

In some embodiments, the flow compensator is configured to decrease the turbulence of the flow of carbonated water dispensed from the carbonator.

In some embodiments, the flow compensator is configured to promote the mixing of carbon dioxide and water in the flow of carbonated water dispensed from the carbonator.

In some embodiments, the carbonator is an inline carbonator.

In another aspect, a method is disclosed including, using a flow compensator including the apparatus of any of the types described above: receiving an input flow of carbonated water at the inlet port; and dispensing an output flow of carbonated water from the outlet port.

Some embodiments include using the flow compensator to reduce the turbulence of output flow relative to the input flow.

Some embodiments include using the flow compensator to promote the mixing of water and carbon dioxide in the carbonated water.

Some embodiments include: directing the input flow from the inlet port through a first relatively large cross section portion of the conduit to a relatively small cross section portion of the conduit, and directing the flow from the relatively small cross section portion of the conduit towards the outlet port to form the output flow.

Some embodiments include providing substantially laminar flow through the at least a portion of the relatively small cross section portion of the conduit.

Some embodiments include: maintaining substantially constant pressure in the flow through at least a portion of the relatively small cross section portion of the conduit.

Some embodiments include interrupting or diverting a portion of the flow through at least a portion of the relatively small cross section portion of the conduit.

Some embodiments include interrupting or diverting a portion of the flow using a surface feature on the insert to reduce the local velocity of the flow in a region adjacent the surface feature.

In some embodiments, the local velocity is reduced to less that 50% of an average flow velocity through the relatively small cross section portion of the conduit.

In some embodiments, the local velocity is reduced to less that 25% of an average flow velocity through the relatively small cross section portion of the conduit.

Some embodiments include adjusting a flow rate of the output flow by using the facility to adjust the position of the insert within the conduit.

Some embodiments include adjusting a carbonation level of the output flow by using the facility to adjust the position of the insert within the conduit.

Various embodiments may include any of the above described elements, alone or in any suitable combination.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings, which are incorporated in and constitute a part of this specification, illustrate one or more embodiments described herein and, together with the description, explain these embodiments. Like reference characters refer to the same parts throughout the different views. The drawings are not necessarily to scale, emphasis instead being placed upon illustrating the principles of the embodiments. While exemplary dimensions are shown (in arbitrary units) in some figures it is to be understood that other dimensions may be used.

FIG. 13A shows a side view of the compensator insert. FIG. 13B is a side view of the compensator housing, ghosted lines indicated internal features. FIG. 13C is a cross sectional view of the housing.

DETAILED DESCRIPTION

Figure 1:
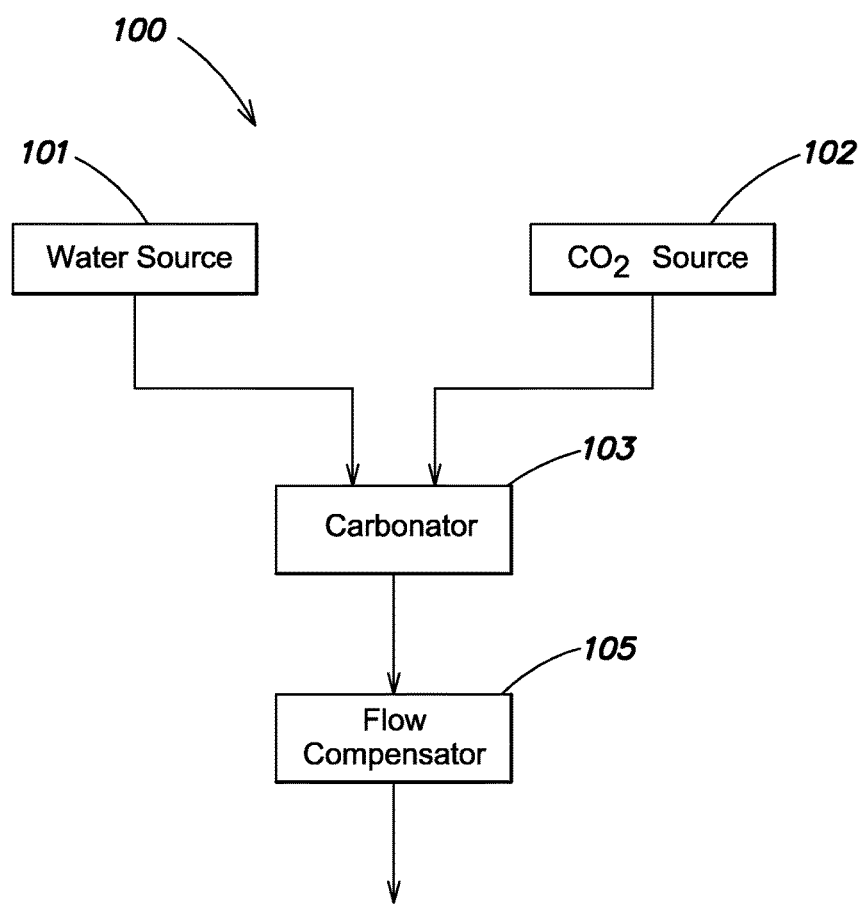
FIG. 1 is a block diagram of a system for dispensing carbonated water.

FIG. 1 shows a system 100 for dispensing carbonated water. The system includes a water source 101 (e.g., a source of chilled and/or filtered water) and a carbon dioxide gas source 102. A carbonator 103 receives water and carbon dioxide gas from the sources 101, 102, and outputs a flow of carbonated water. For example, in some embodiments, the carbonator 103 is an in line carbonator, e.g., of the type described in U.S. patent application Ser. No. 12/772,641 filed Mar. 3, 2010 entitled "APPARATUSES, SYSTEMS AND METHODS FOR EFFICIENT SOLUBILIZATION OF CARBON DIOXIDE IN WATER USING HIGH ENERGY IMPACT," (now U.S. Pat. No. 8,567,767) the entire contents of which are incorporated herein by reference. This reference describes an apparatus that can be placed in a water line path to create carbonated water for dispensing. The apparatus accepts carbon dioxide and water through an inlet path. From there the flow of carbon dioxide and water are passed through one or more dispersion elements arranged within the conduit to create a dispersed flow (e.g., an annular dispersed flow). The dispersed flow then passes through a passive accelerator within the conduit, thereby greatly increasing the kinetic energy of the system. The accelerated flow is directed to collide with a rigid impact surface immediately downstream of the passive accelerator. This collision creates sufficient pressure to solubilize the carbon dioxide into the water. A retention network is provided at the output of the apparatus to collect and regulate the flow of carbonated water.

In other embodiments, the carbonator 103 may include other (non-"in line") carbonator types. For example, some carbonators use carbon dioxide sprayed into a water container. Other carbonators employ a carbonating tank, called a saturator, and a high-pressure water pump. Carbonated water is produced by pressurizing the saturator tank with carbon dioxide and filling the tank with chilled water. Due to the high pressures resident in the saturator tank, typically around 70 psi, a relatively expensive high pressure water pump may be required to inject water into the tank. Furthermore, under the conditions in the saturator tank, the carbon dioxide takes time to dissolve into to the water and achieve a palatable level of carbonization. Accordingly, the saturator is typically large enough to hold a ready supply of carbonated water for dispensing and does not create new carbonated water instantaneously on demand. To maintain this supply, two or more sensors—and associated electronic controls—are typically used to start the high pressure pump and inject water into saturator when the level of carbonated water in the saturator falls below a set threshold and then stop the water injection when the tank fills to an appropriate level.

The carbonated water flow output from the carbonator may have one or more undesirable characteristics, such as an unwanted level of turbulence, a flow rate that is inappropriate for dispensing, etc. For example, a high level of turbulence may degrade the level of carbonation. A poorly controlled or inconsistent output flow rate may result in spattering or other unwanted effects if the flow were to be dispensed directly from the carbonator 103.

Accordingly, a flow compensator 105 is provided. The compensator 105 receives the output flow from the carbonator 103, operates on the flow to regulate one or more properties of the flow (e.g., turbulence, flow rate, etc.) and outputs a regulated flow of carbonated water. The flow from the carbonator 105 may be relatively turbulent, e.g., characterized by an average (or peak) Reynolds number of 1000 or more, 1500 or more, 2000 or more 2500 or more, 3000 or more, 3500, or more, 4000 or more, etc.

Figure 2A:
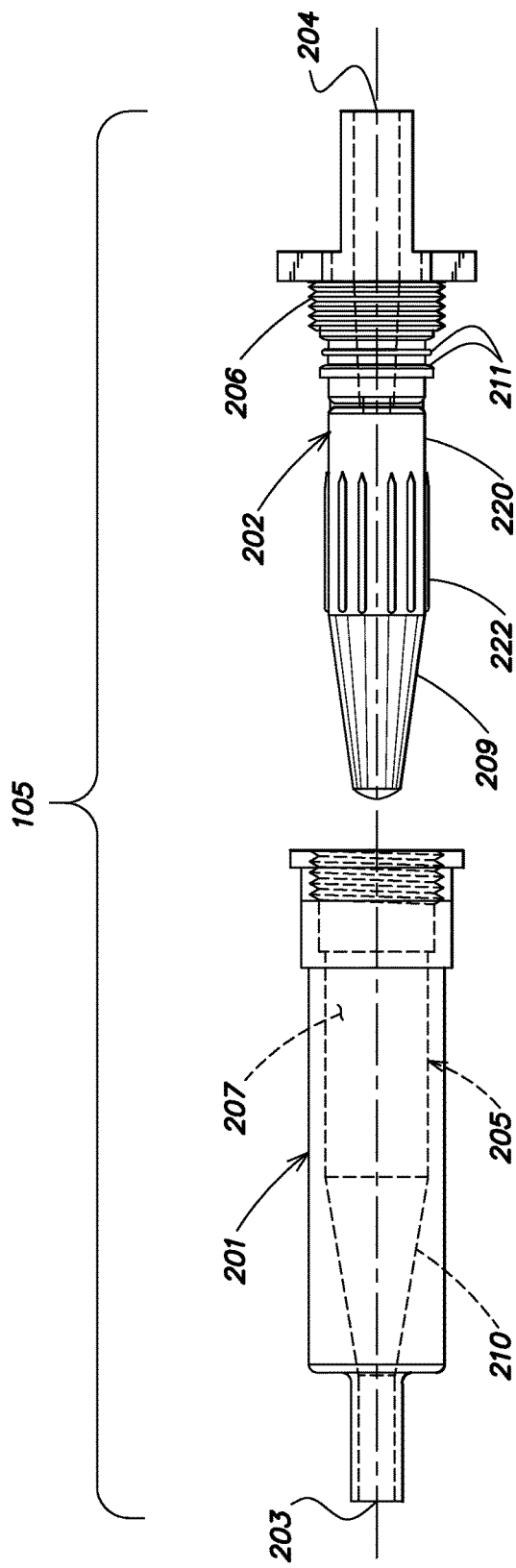
FIG. 2A shows a disassembled view of a flow compensator. Ghosted lines indicated internal features.
Figure 2B:
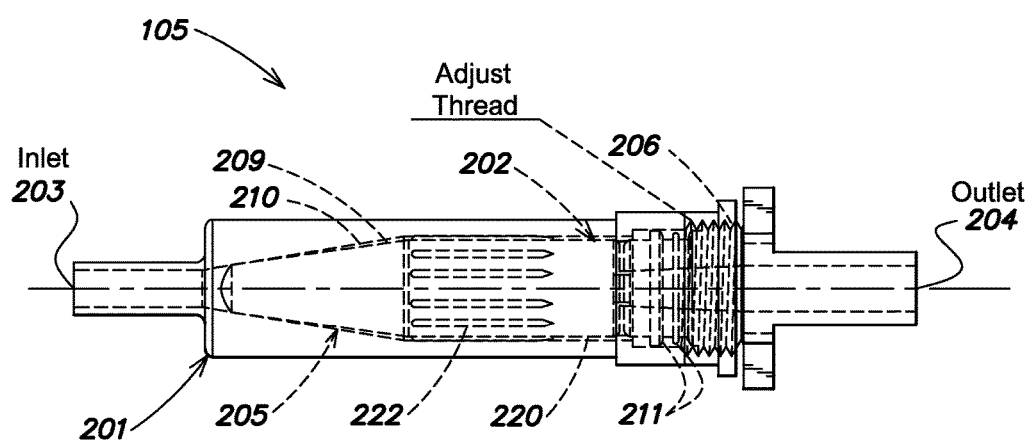
FIG. 2B shows an assembled view of the flow compensator of FIG. 2A. Ghosted lines indicated internal features.

FIGS. 2A and 2B illustrate an exemplary embodiment of the flow compensator 105. FIG. 2A is an exploded view and FIG. 2B is an assembled view. The flow compensator 105 includes a housing 201 and an insert member 202. The housing 201 includes an inlet port 203 and the insert member 202 includes an outlet port 204. As shown, the inlet and outlet ports 203, 204 include stem portions to facilitate connections with external devices (e.g., a connection between the output of carbonator 103 and the inlet port 203). In various embodiments any other type of (preferable fluid tight) connectors may be used.

A conduit 205 extends through the housing 201. When assembled, a portion of insert 202 is positioned in the conduit 205. The insert 202 acts to seal the conduit 205 such that a flow of carbonated water into the inlet port 203 flows through the conduit along the insert 202 and is output through the outlet port 204.

The flow compensator 105 includes a facility 206 for adjusting the position of the insert 202 inside the conduit 205. As shown, the facility 206 is made up of a threaded attachment between an end of the insert 202 and a corresponding threaded hole in the housing 201. The end of the insert 202 includes a pentagon handle that allows the insert 202 to be turned (e.g., using pliers) to advance or retract the insert 202 into or out of the conduit 205. In various embodiments, any other type of adjustable attachment may be used. As described in greater detail below, the facility 206 allows for adjustment of one or more properties (e.g., flow rate, turbulence, carbonation level, etc.) of the regulated flow output from the outlet port 204. The facility 206 may allow for adjustment of the position of the insert 202 while maintaining the fluid tight seal between the insert and housing. For example, as shown two O-rings 211 (e.g., made of an elastomeric material such as rubber material) on the insert 202 form a slidable seal between the insert and the housing.

As shown the conduit 205 extends along a longitudinal axis (indicated with a dotted line) from a proximal end near the inlet port 203 to a distal end near thread feature. The conduit 205 includes a tubular passage 207 disposed about and extending from the inlet port 203 along this longitudinal axis to a back wall formed by when the insert 202 is attached to the housing 201. The outlet port 204 is positioned distal from the inlet port 203. The outlet port 204 is in fluid communication with the tubular passage 207.

When assembled, the insert 202 extends along the longitudinal axis from a proximal end located within the conduit 205, to a distal end that extends outside of the housing 201. The insert 202 includes a tapered portion 209 that is narrower towards the proximal end of the insert (i.e., the end of the insert facing the inlet port 201) and wider towards the distal end of the insert. The tapered portion, generally, has a cone angle between 7.5° to 15°. The conduit 205 may include a correspondingly tapered shaped portion 210, such that conduit and insert cooperate to form a narrow conical channel. This conical channel has a cross sectional area (taken along the direction transverse to the longitudinal axis) which is smaller than the cross sectional area of the portion of the conduit 205 adjacent the inlet port. In some embodiments, the cross sectional area may be reduced by a factor of 2, 3, 4, 5, 10, 100, etc or any other desirable amount. By adjusting the position of the insert 202 using facility 206, the cross sectional area of the conical channel can be varied to control the rate of flow through the compensator and/or other flow properties.

The surface of the tapered portion 209 and the surface of the correspondingly shaped portion 210 of the conduit 205 may be smooth. As described in greater detail below, this smooth narrow channel promotes laminar flow through the compensator 105, thereby reducing the turbulence of the flow.

Figure 4:
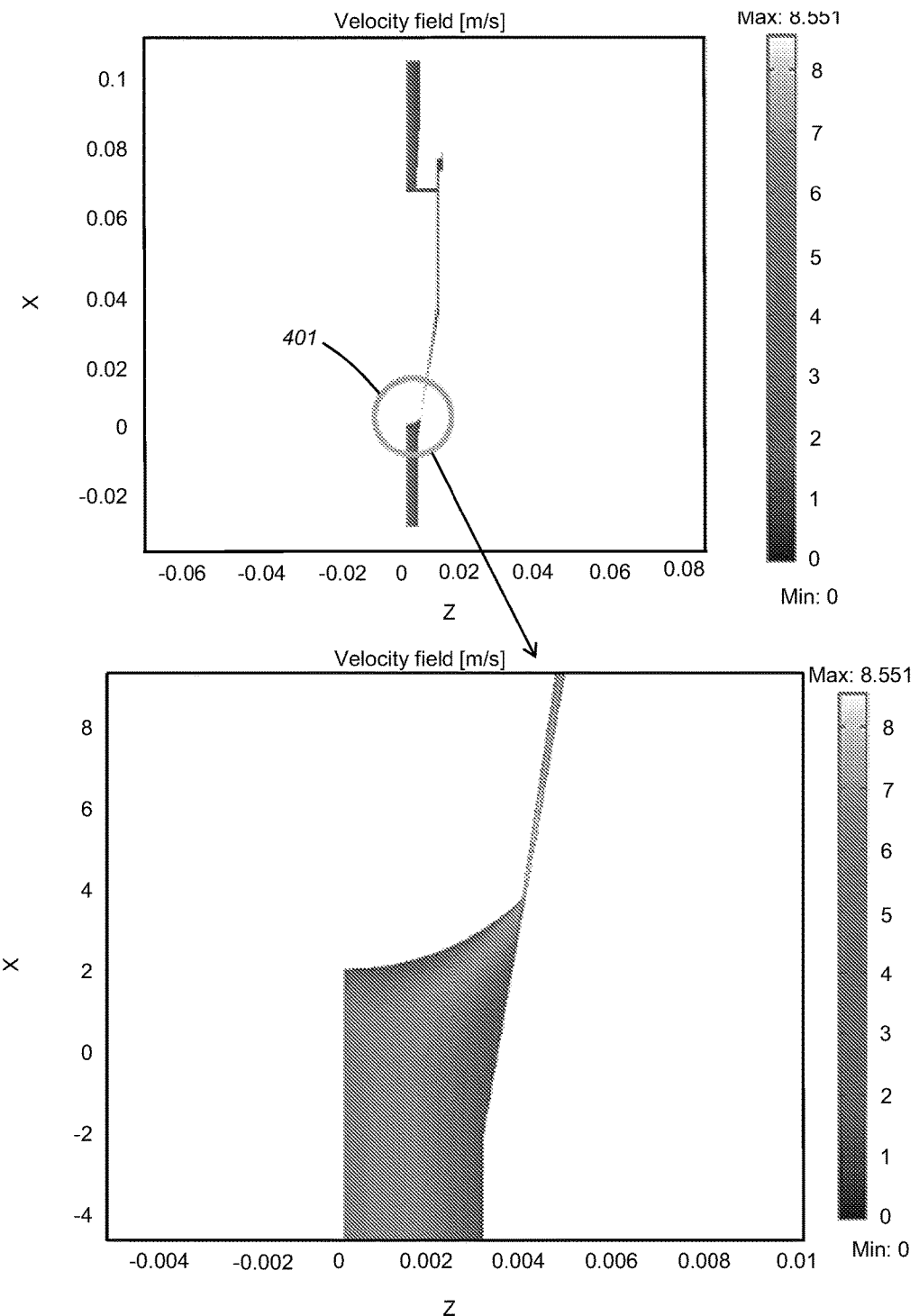
FIG. 4 is a plot of the velocity field of a carbonated water flow through the flow compensator of FIGS. 2A-2B.
Figure 5:
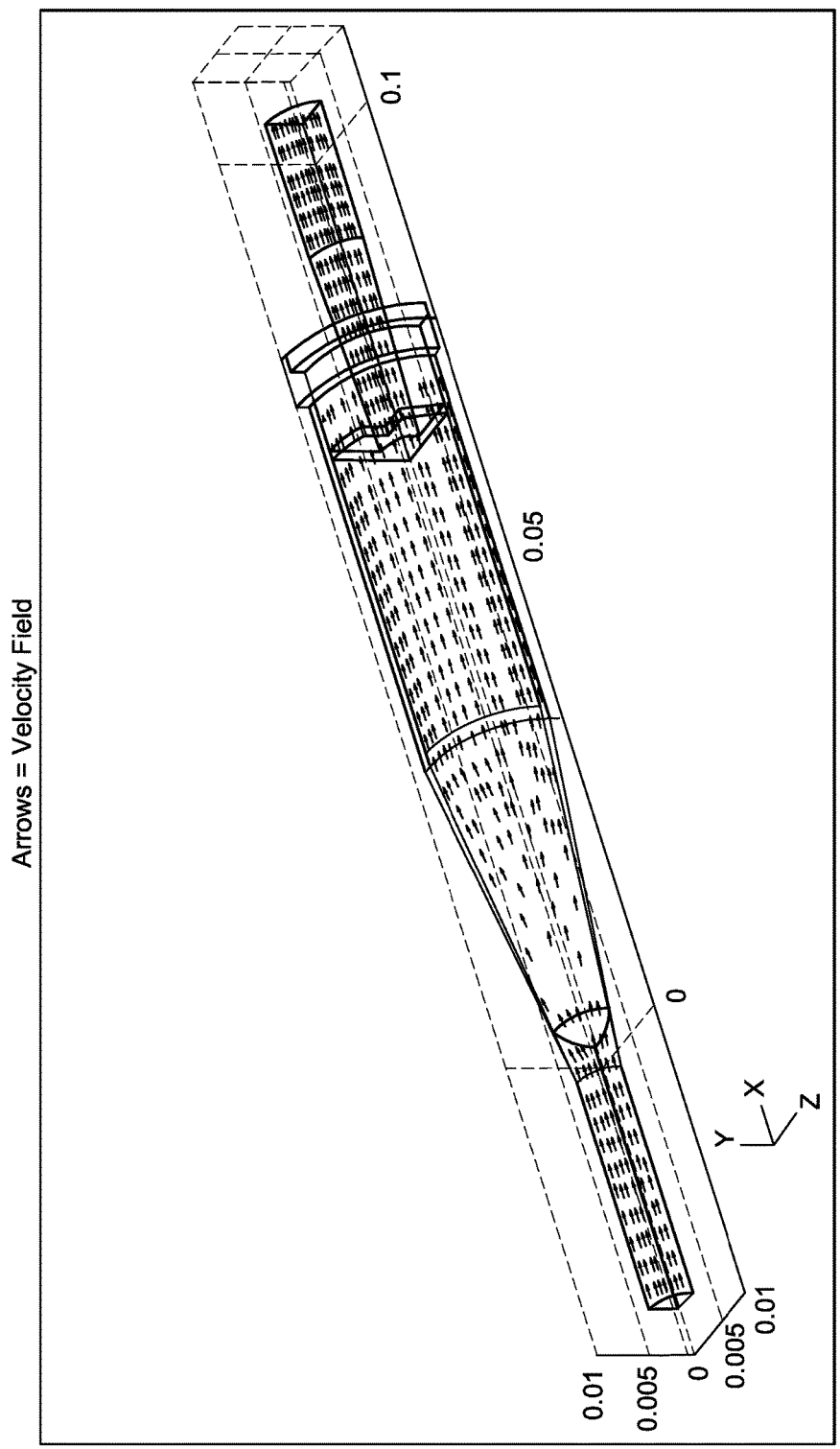
FIG. 5 is a plot showing the flow lines of the velocity field of a carbonated water flow through the flow compensator of FIGS. 2A and 2B.
Figure 6:
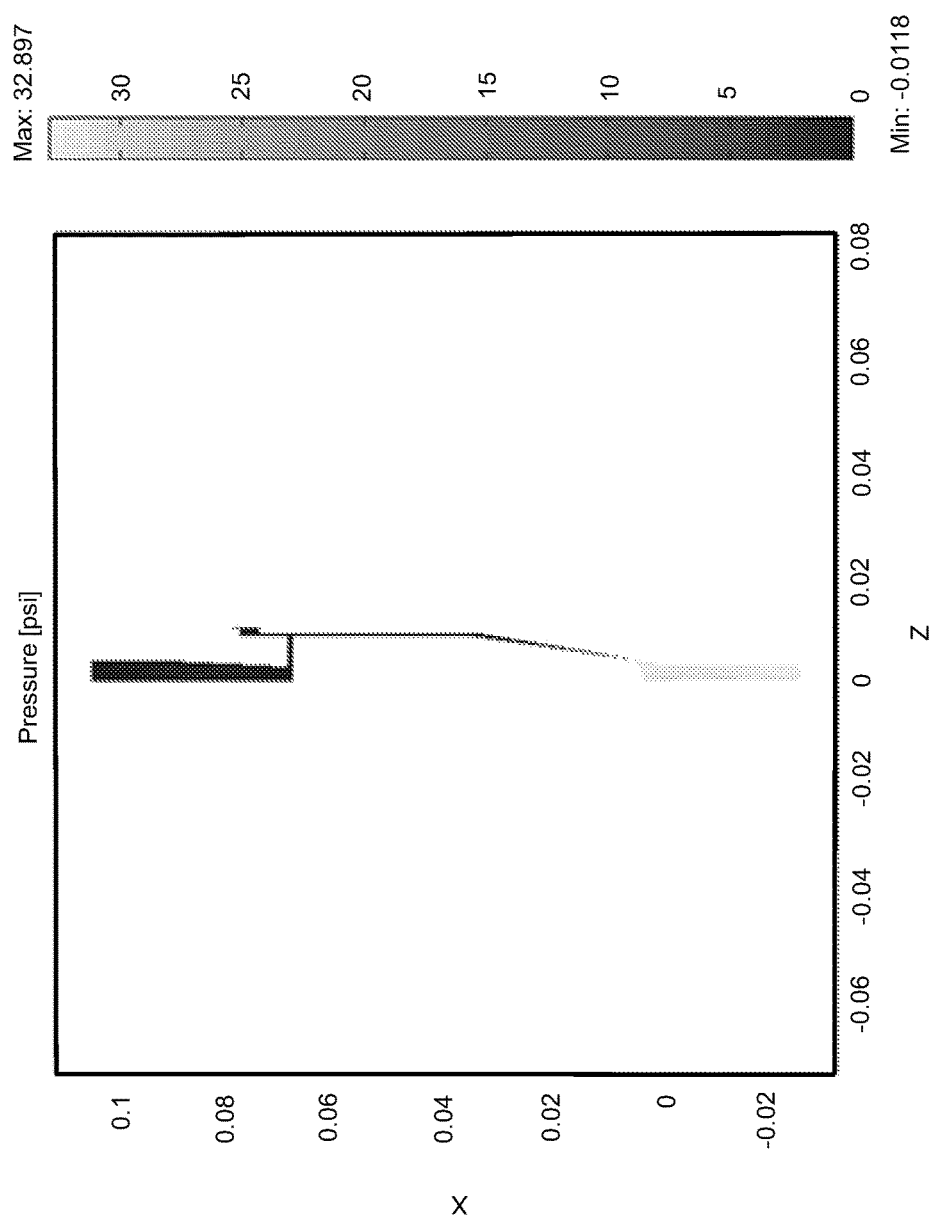
FIG. 6 is a plot of the pressure of a carbonated water flow through the flow compensator of FIGS. 2A and 2B.

For example, FIGS. 4-6 show the results of a numerical simulation of the flow through an exemplary embodiment of the compensator 105 shown in FIGS. 2A and 2B. Conservation of momentum and mass equations were solved to obtain dynamic results of the flow behavior through the compensator 105. Equations were solved using COMSOL Model for incompressible stationary flow, fully developed inlet with no slip wall condition. A software package for implementing this modeling may be obtained from COMSOL, Inc. of 1 New England Executive Park, Suite 350, Burlington Mass. 01803. The simulations shown were carried out using a flow rate of 1.5 L/min and an input flow pressure of about 35 psi. Qualitatively similar results were also obtained using an input pressure of 120 psi. At constant flow rate, the input pressure to the compensator will vary with respect to the position of insert 202 inside the housing 201.

FIG. 4 shows a greyscale plot of the magnitude of the velocity vector field for the flow. FIG. 5 shows the corresponding stream lines. FIG. 6 shows a greyscale plot of the pressure of the flow.

As shown in FIGS. 4 and 5, the magnitude of the velocity of the flow from the inlet port 203 increases dramatically in the region 401 near the narrow tip of the tapered portion 209 of the insert 202, as the flow path through the conduit 205 transitions from a tubular shape with a large cross sectional area to a narrow conical shape with a smaller cross sectional shape. However, as the flow moves through the smooth narrow channel formed along the conical portion 209 of the insert 202, the flow velocity becomes relatively stable. This allows for smooth, laminar flow through the narrow channel, with a low level of pressure variation (as shown in FIG. 6). For example, in some embodiments, the flow through the conical channel along a significant portion (e.g., at least 50%, at least 60%, at least 70% at least 80%, at least 90% or more) of the tapered section 209 of the insert 202 may be characterized by a Reynolds number of 2500 or less, 2000 or less, 1500 or less, 1000 or less, 500 or less, or even smaller. The pressure for the corresponding flow along the corresponding portion of the insert 202 may vary by less than e.g., 25%, 10%, 5%, 1%, or less than the average pressure. This type of flow advantageously prevents the separation of carbon dioxide and water, thereby helping to maintain the level of carbonation.

Figure 3:
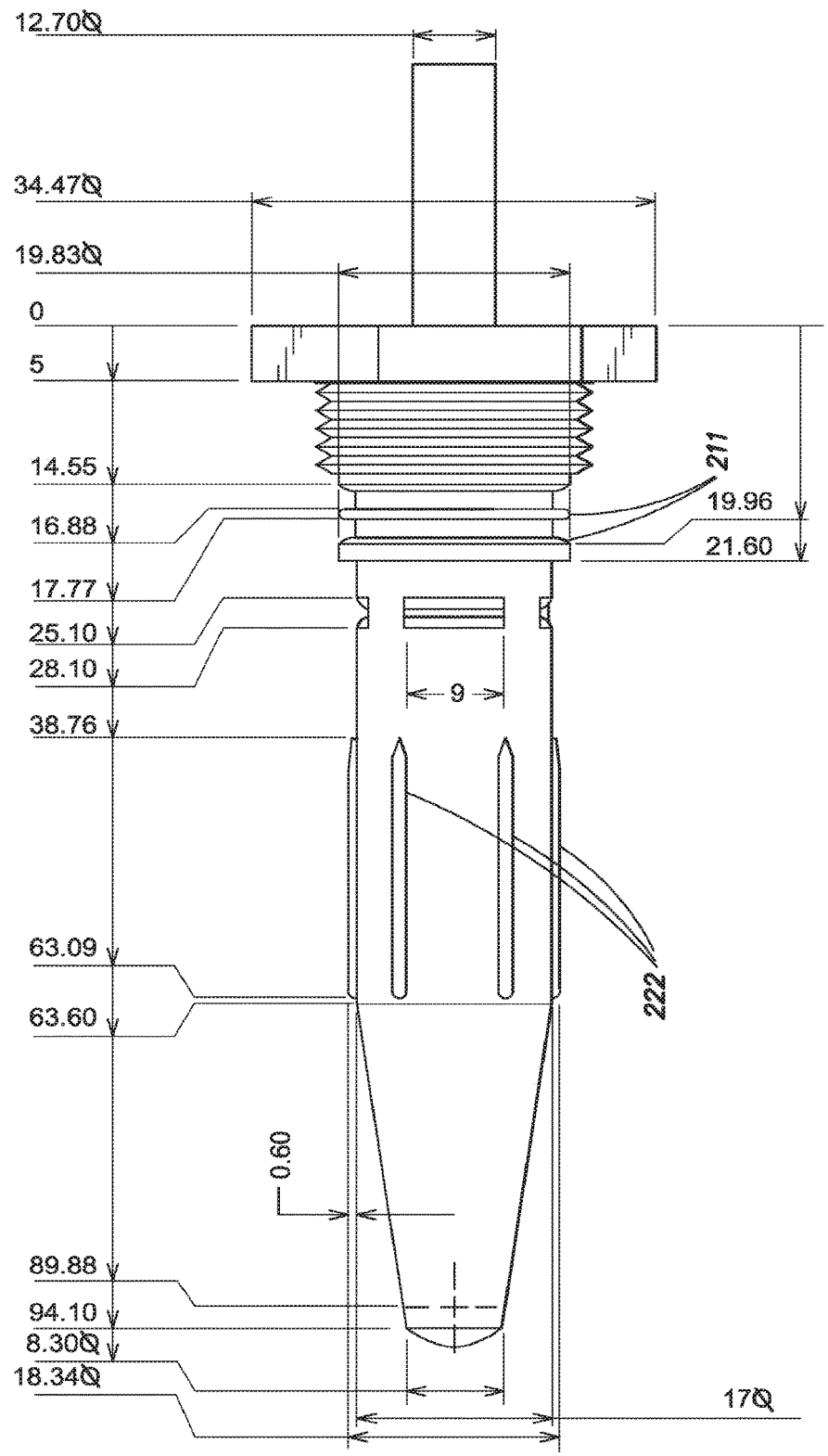
FIG. 3 is a detailed view of an insert for the flow compensator of FIGS. 2A and 2B.

Referring again to FIGS. 2A and 2B, along with FIG. 3, a portion of the surface of the insert 202 may include one or more surface features used to further condition the fluid flow through the compensator 105. For example, as shown in FIGS. 2A, 2B, and 3, the insert 202 includes a cylindrical portion 220 located distal (i.e., closer to the outlet port 204) to the wide end of the tapered portion 209 of the insert 202. Several protrusions 222 (as shown, cylindrical embossments) extend from the surface of the cylindrical portions into the flow channel formed between the surface of the cylindrical portion 220 of the insert 202 and the wall of the conduit 205. These protrusions 222 interrupt and/or divert the flow of fluid through he compensator 105.

In the embodiment shown, the protrusions are arranged in circular pattern about the longitudinal axis.

As will be understood by one skilled in the art, any suitable arrangement of the protrusions 222 may be used, including a regular array, a random arrangement, a single ring, more than two rings, etc. In some embodiments, the protrusions may (additionally or alternatively) extend from the surface of the conduit 205 into the flow channel formed between the conduit 205 and the insert 202.

As shown in the simulation results of FIGS. 4-6, the protrusions slow down, and divert the flow at local regions (e.g., regions labeled 402). Referring to FIG. 5, the streamlines of the flow are detoured when the carbon dioxide water mixture flows around the protrusions.

As noted above, the protrusions 222 act to regulate and stabilize the flow. They may also serve to divert the flow toward the outlet port 204. According, in some embodiments, the impact between inlet flow and the back wall of the tubular passage 207 is not significant. The regulated flow may also provide a longer contact time and a larger contact surface area between the carbon dioxide and water in the flow resulting in a better carbonation level and a stabilized flow.

Figure 7A:
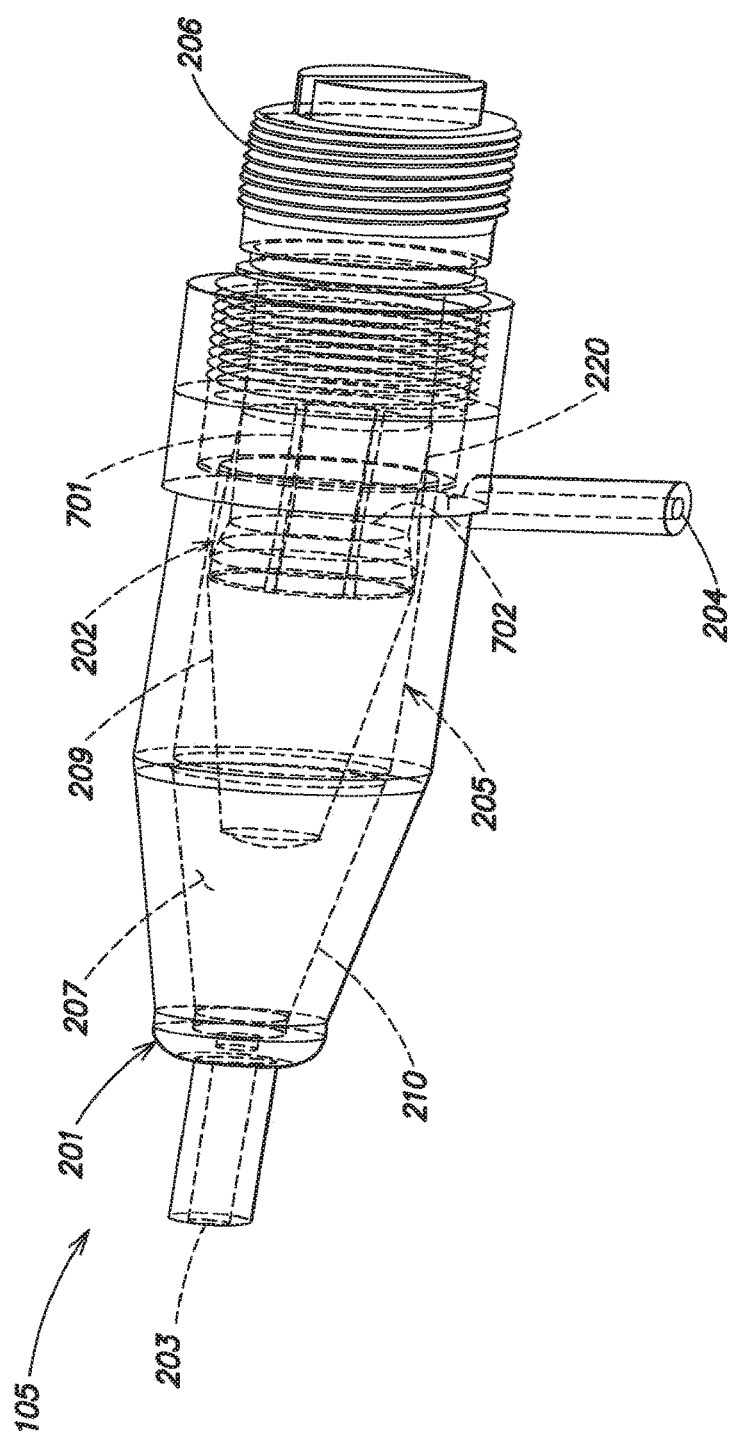
FIG. 7A shows a disassembled view of a flow compensator with an insert featuring ribs and channels. Ghosted lines indicated internal features.
Figure 7B:
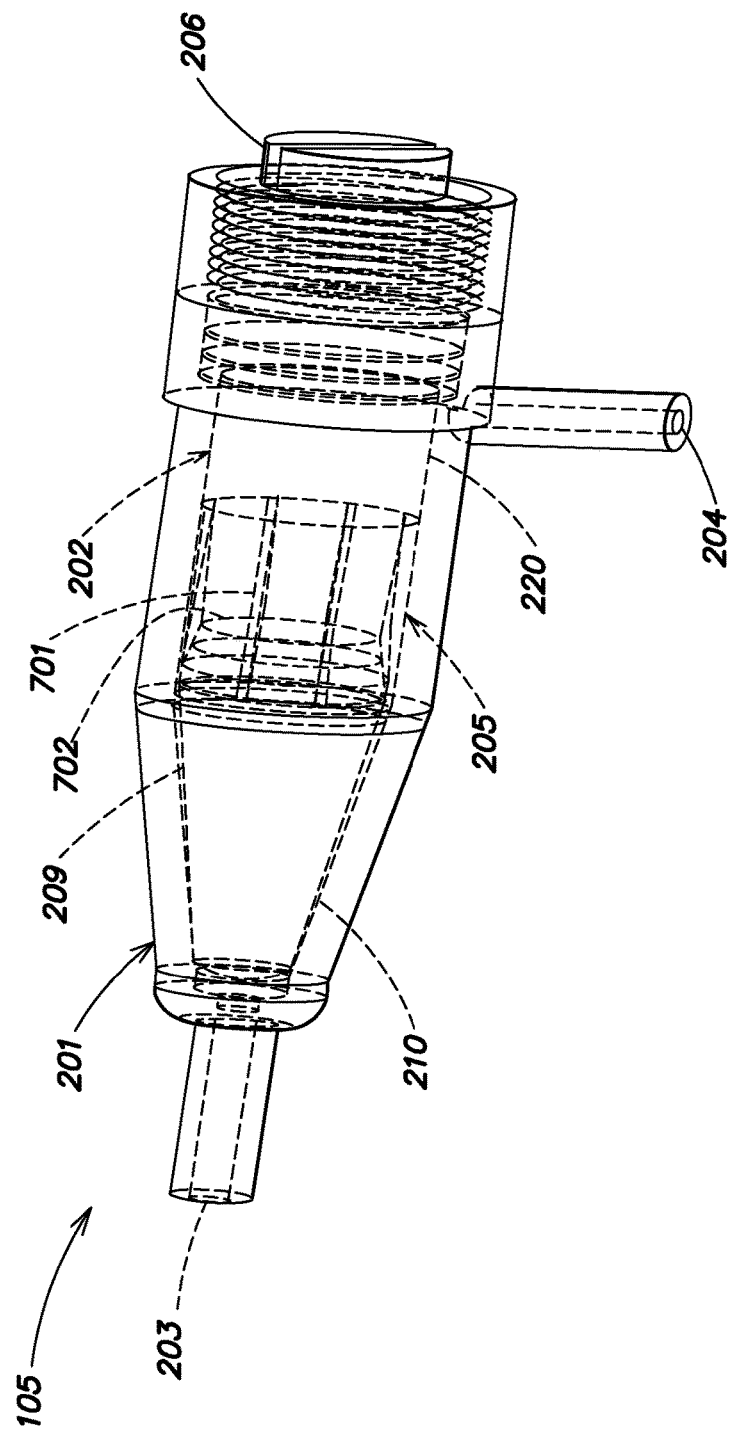
FIG. 7B shows an assembled view of a flow compensator with an insert featuring ribs and channels. Ghosted lines indicated internal features.

FIGS. 7A and 7B illustrate another exemplary embodiment of the flow compensator 105. FIG. 7A is a disassembled view and FIG. 7B is an assembled view. The flow structure of flow compensator 105 is substantially the same as that shown in FIGS. 2A and 2B, except that the surface of cylindrical portion 220 of the insert 202 does not include the cylindrical protrusions 222. Instead, the surface of cylindrical portion 220 includes alternating ribs 701 and channels 702 extending in a direction along the longitudinal axis.

Figure 7C:
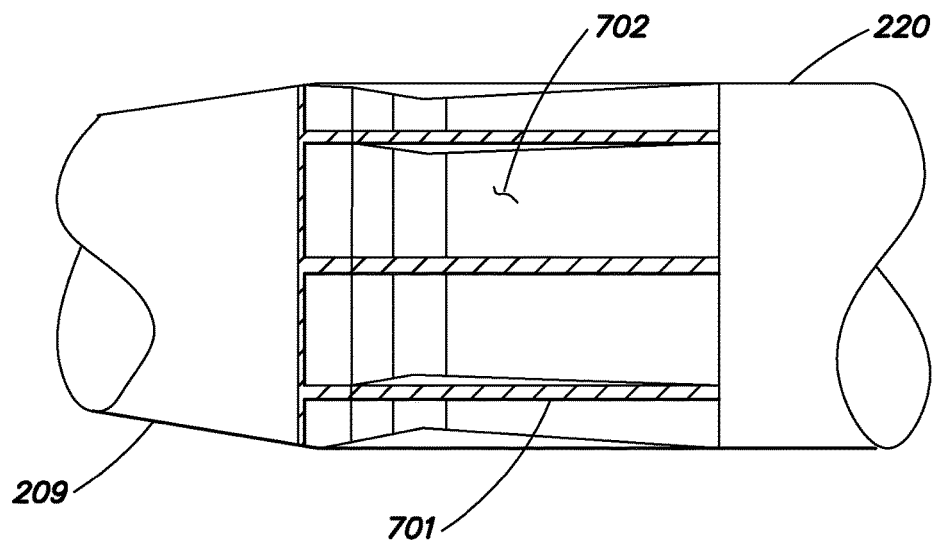
FIG. 7C is a detailed view of the insert from FIGS. 7A and 7B showing the ribs and channels.

FIG. 7C shows a detailed view of the ribs 701 and channels 702. The depth of the channels 702 increases with increasing distance from the tapered portion 209 of the insert 202 to a maximum depth, and then decreases. Accordingly, the cylindrical portion 220 has an hourglass shape with a waist having a minimum diameter from the longitudinal axis. The ribs 701 separate adjacent channels 702.

The ribs 701 and channels 702 operate to decrease the magnitude of the velocity of the flow through the channels 702. This slowing may provide a longer contact time and a larger contact surface area between the carbon dioxide and water in the flow resulting in a better carbonation level and a stabilized flow. In various embodiments, the local magnitude of the flow velocity through the channels 702 at their deepest point will be less than 50%, 25%, 10%, etc. of the velocity of the flow as it enters the channels. In general, deeper channels will have a more dramatic slowing effect.

The channels 702 further operate to reduce the turbulence of the flow (i.e., providing a laminar flow) and maintain a consistent pressure. For example, in some embodiments, the flow through the channels 702 along a significant portion (e.g., at least 50%, at least 60%, at least 70%, at least 80%, at least 90% or more) of the cylindrical section 220 of the insert 202 may be characterized by a Reynolds number of 2500 or less, 2000 or less, 1500 or less, 1000 or less, 500 or less, or even smaller. The pressure for the corresponding flow along the corresponding portion of the insert 202 may vary by less than e.g., 25%, 10%, 5%, 1%, or less than the average pressure. This type of flow advantageously prevents the separation of carbon dioxide and water, thereby helping to maintain the level of carbonation.

For example, FIGS. 8-12 show the results of a numerical simulation of the flow through an exemplary embodiment of the compensator 105 of the type shown in FIGS. 7A-7C. Conservation of momentum and mass equations were solved to obtain dynamic results of the flow behavior through the compensator 105. Once again Equations were solved using COMSOL Model for incompressible stationary flow with no slip wall condition. The simulations shown were carried out using a flow rate of 1 L/min and an input flow pressure of 20 psi. Qualitatively similar results were also obtained using an input pressure of 120 psi. At constant flow rate, the input pressure to the compensator will vary with respect to the position of insert 202 inside the housing 201.

Figure 8:
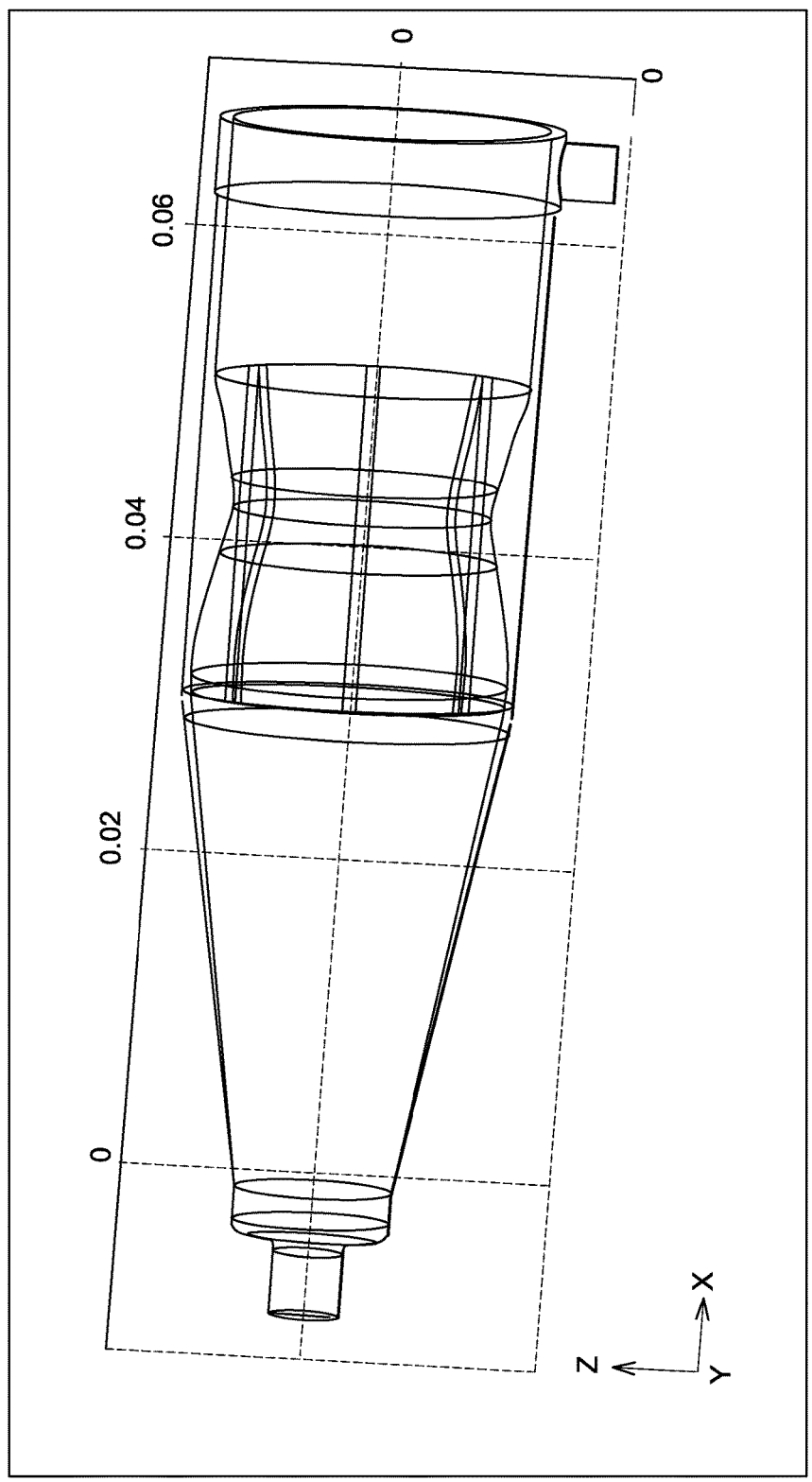
FIG. 8 is a schematic of the fluid flow layer geometry through the compensator shown in FIGS. 7A-7C.
Figure 9:
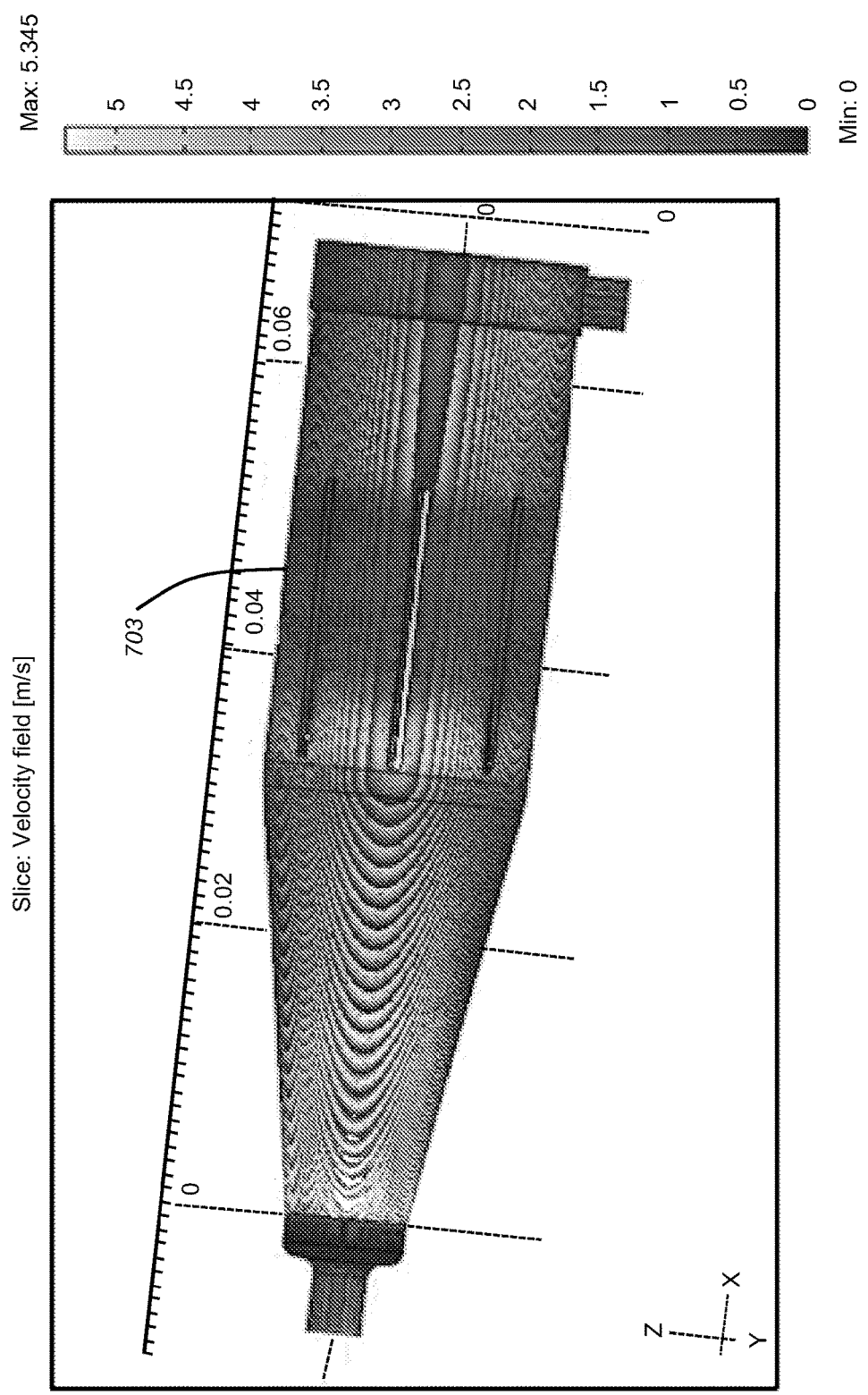
FIG. 9 is a plot of the velocity field of a carbonated water flow through the flow compensator of FIGS. 7A-7C.
Figure 10:
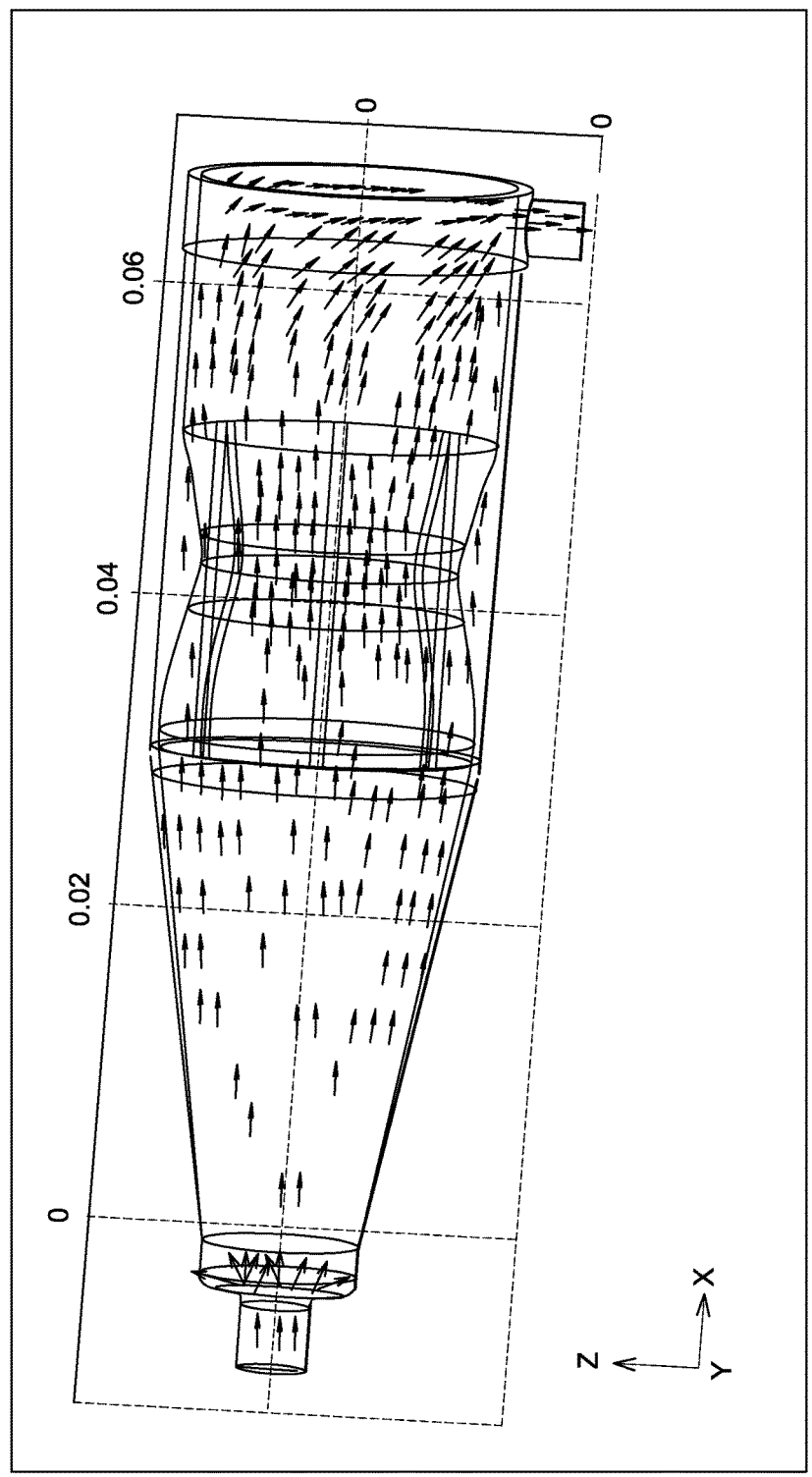
FIG. 10 is a plot showing the stream lines of the velocity field of a carbonated water flow through the flow compensator of FIGS. 7A-7C.
Figure 11:
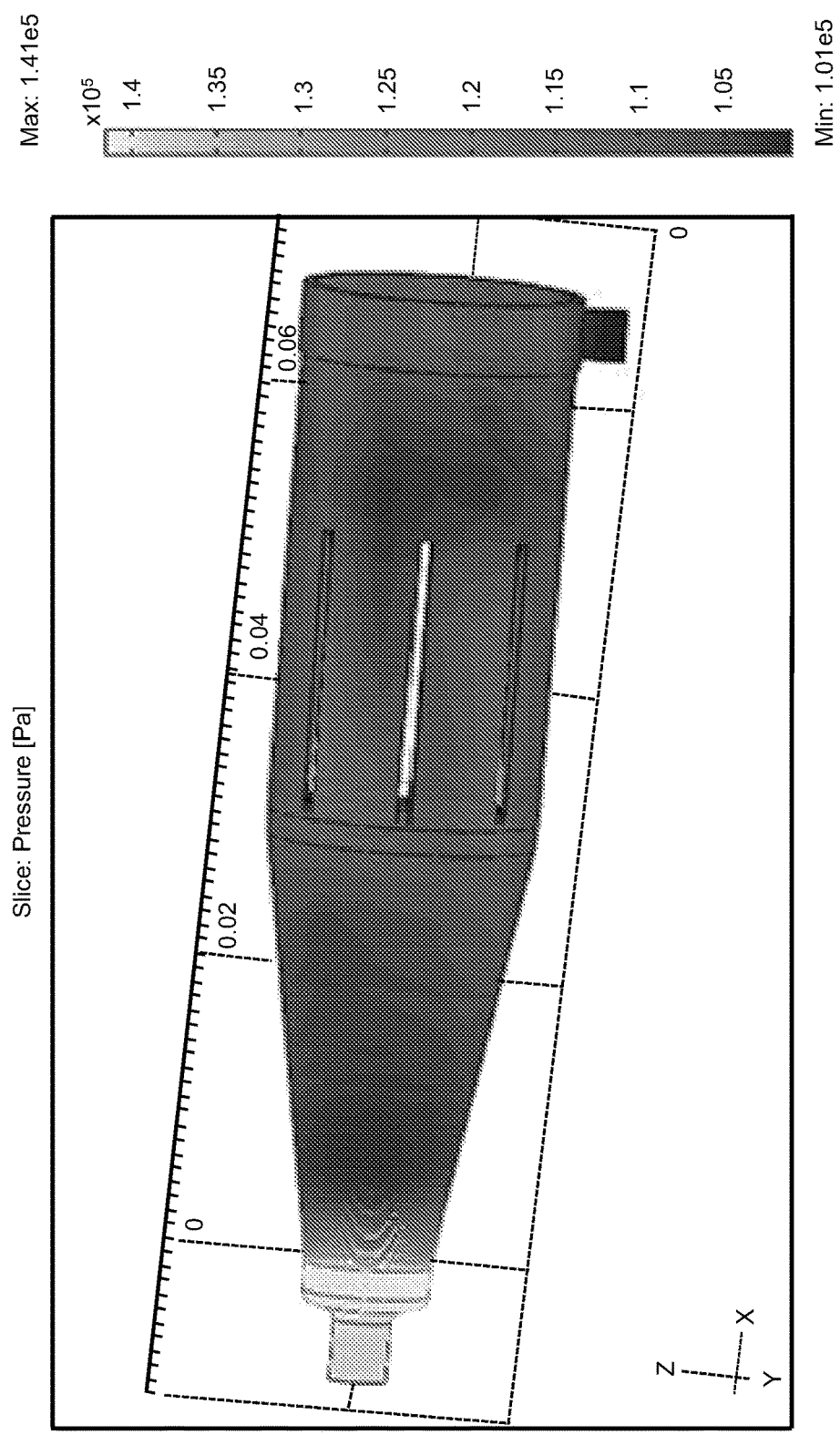
FIG. 11 is a plot of the pressure of a carbonated water flow through the flow compensator of FIGS. 7A-7C.
Figure 12:
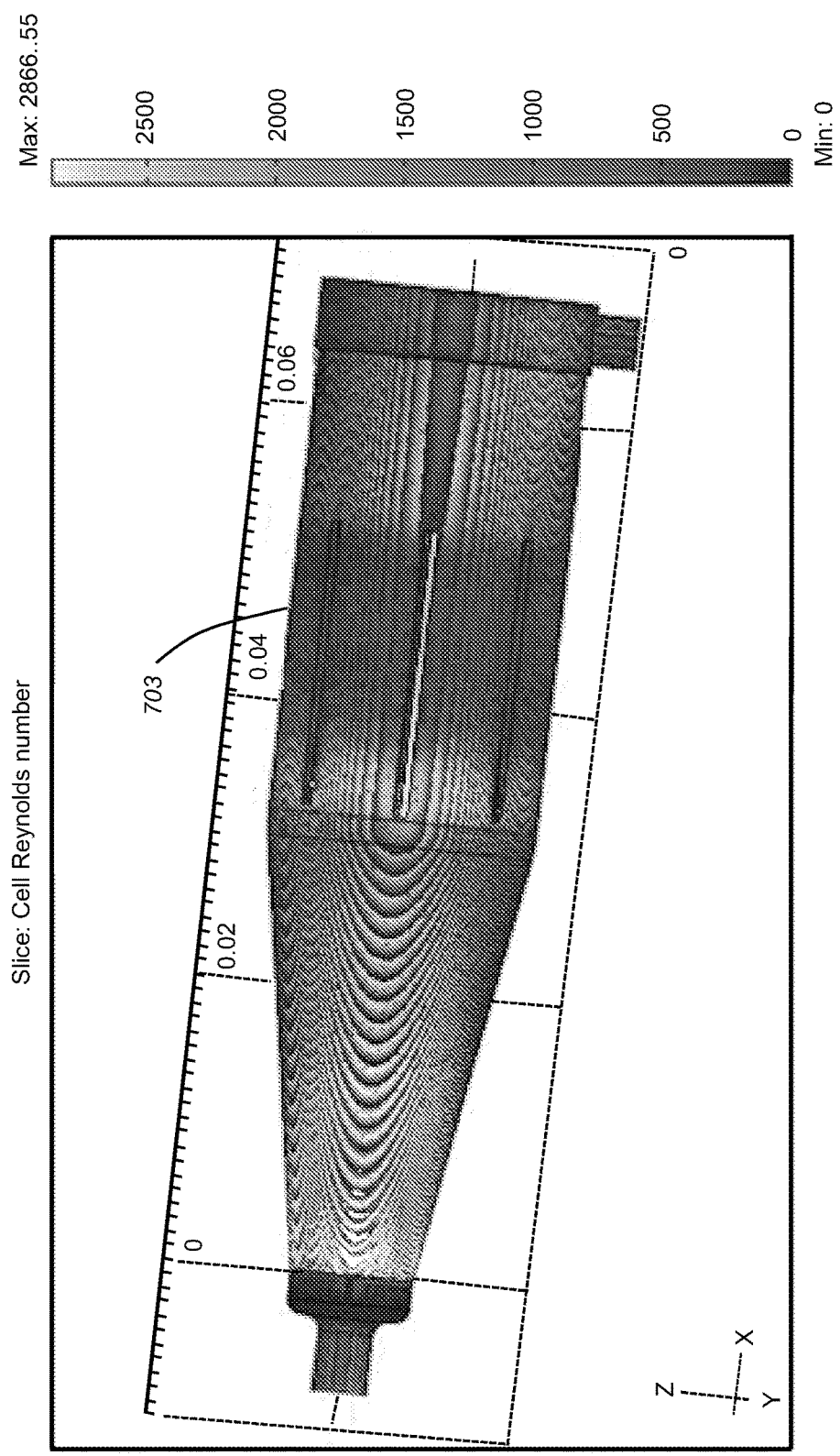
FIG. 12 is a plot of the Reynolds number of a carbonated water flow through the flow compensator of FIGS. 7A-7C.

FIG. 8 is a schematic showing the geometry of the modeled flow. FIG. 9 shows a greyscale plot of the magnitude of the velocity vector field for the flow. FIG. 10 shows the corresponding stream lines. FIG. 11 shows a greyscale plot of the pressure of the flow. FIG. 12 shows a greyscale plot of the Reynolds number of the flow.

As shown in FIGS. 9 and 10, the magnitude of the velocity of the flow from the inlet port 203 decreases dramatically in the region 703 near the deepest portions of the channels 702. In some embodiments, the flow is sufficiently slowed that the impact between inlet flow and the back wall of the tubular passage 207 is not significant.

FIG. 11 confirms that the pressure of the flow remains substantially consistent a as the flow moves through the channels 701. FIG. 12 shows that the Reynolds number of the flow also decreases dramatically in the region 703 near the deepest portions of the channels 702, indicating a smooth laminar flow through the channels 702.

As will be understood by those skilled in the art, in some embodiments, the ribs and groves may be (additionally or alternatively) formed in the wall of the conduit 205 facing the cylindrical portion 220 of the insert 202.

In various embodiments, other types of surface features may be used to condition the flow through the compensator 105 (e.g., to control the velocity, turbulence, direction, etc. of the flow). In some embodiments, the surface features may include a combination of protrusions and ribs and channels.

Figure 13A:
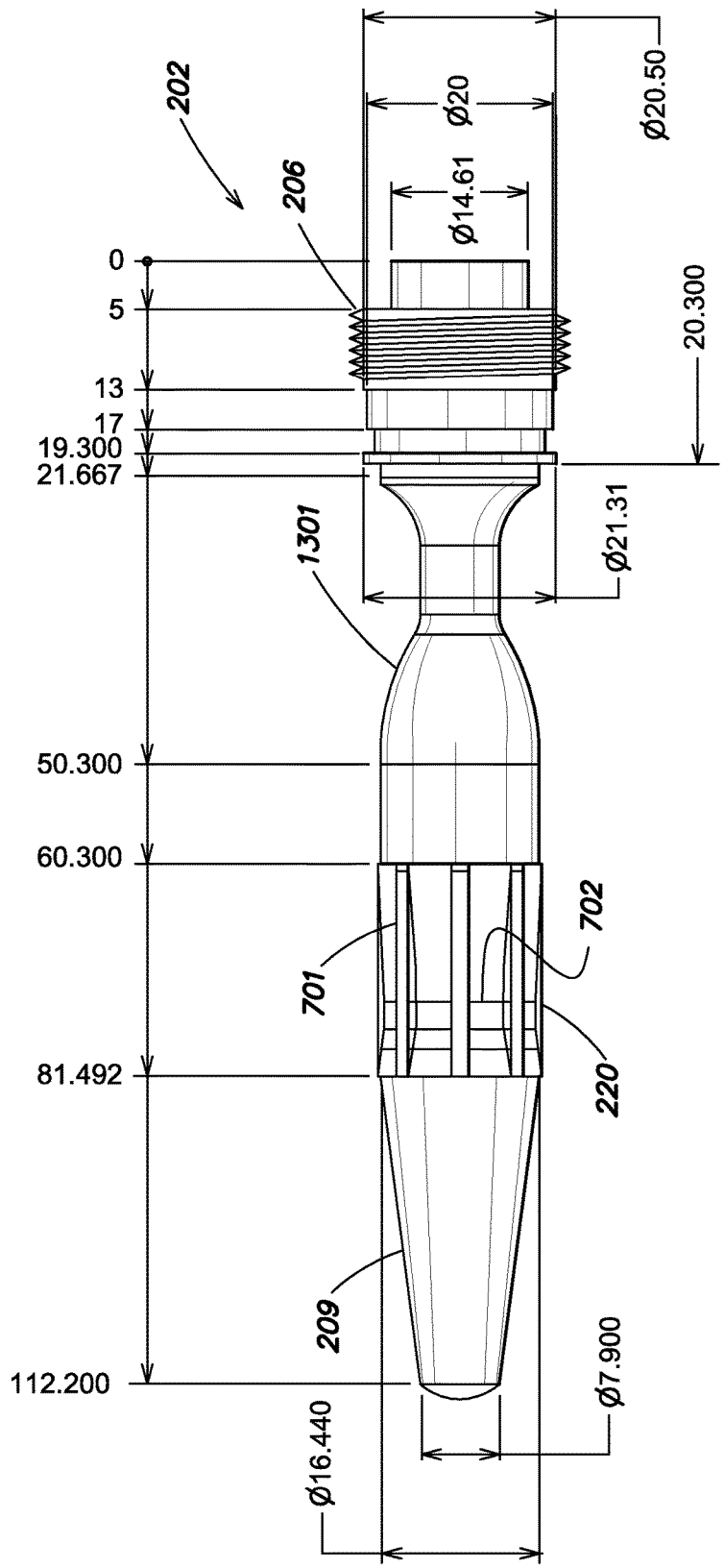
FIGS. 13A-C illustrate another compensator design.
Figure 13B:
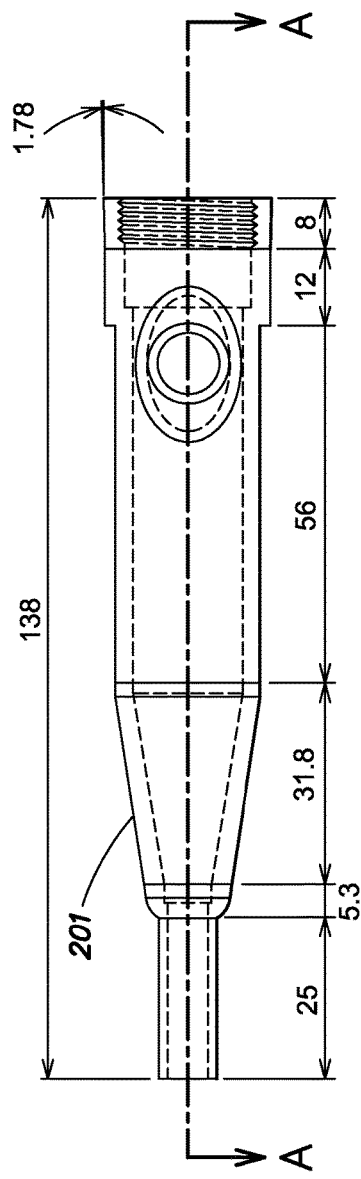
Figure 13C:
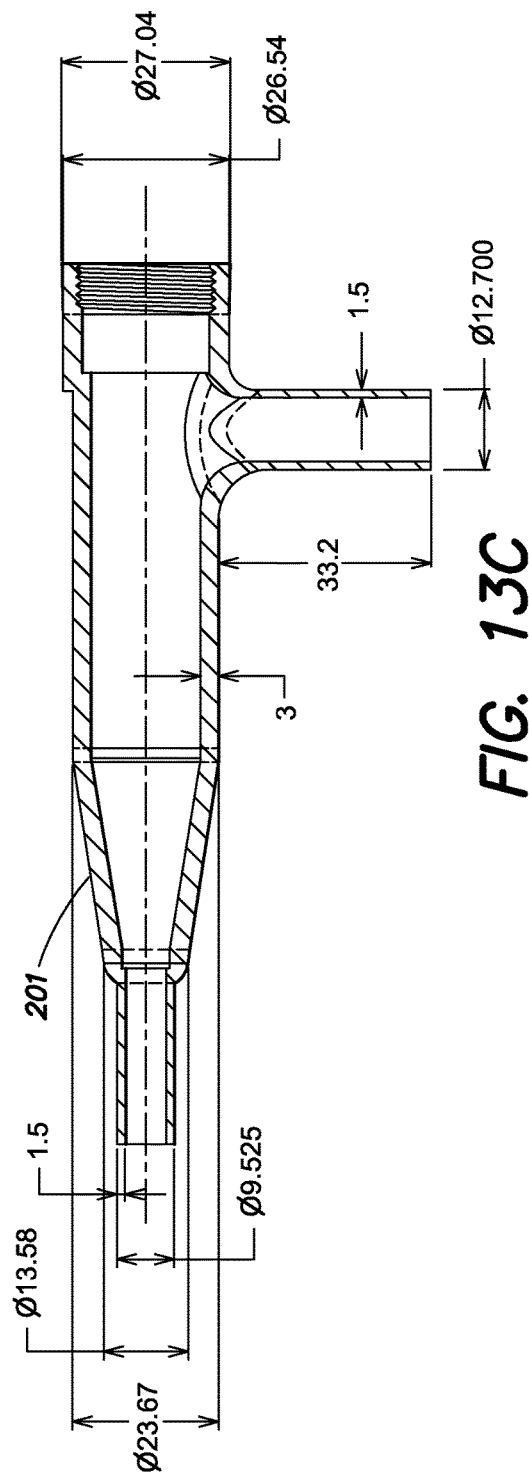

FIGS. 13A-C illustrate another compensator design. FIG. 13A shows a side view of the compensator insert. FIG. 13B is a side view of the compensator housing, ghosted lines indicated internal features. FIG. 13C is a cross sectional view of the housing. The compensator shown is similar is diesign to the compensater shown in FIGS. 7A-7C. However, the insert 201 includes a distal portion 1301 located between the ribbed cylindrical portion 220 and the facility 206. This distal portion is smooth and generally cylindrical, but noarrows to a waste. The narrow portion of the waist may be located proximal to the outlet 204.

The compensator 105 may be made of any suitable material. In some embodiments, the insert and/or housing are formed from or include a plastic (e.g., a thermoplastic) or polymer material (e.g., PFTE, PV, PU, nylon, etc.), a metal (e.g., copper, bronze, iron, steel, stainless steel, etc.), a composite, etc. The components may be fabricated using any suitable technique including, e.g., molding (e.g., injection molding), machining (e.g., using one or more computer numerical controlled "CNC" tools such as a mill or lathe), etc.

Any of the various threaded connections may be national pipe thread tapered thread (NPT) or national pipe thread tapered thread fuel (NPTF) standard connections. In some embodiments, the threaded connections provide leak proof fittings mechanically, without the need for Teflon thread tape or similar applications.

The examples described above are presented with reference to providing flow compensation to a flow of carbonated water. However, as will be understood by one skilled in the art, the devices and techniques described herein may be applied to provide flow compensation for any suitable fluid flow, including any suitable mixed flow of liquid and gas.

Although the examples above describe embodiments of the compensator 105 which allow for adjustment of the position of the insert 202 in housing 201, in other embodiments this position may be fixed (e.g., where inset 202 and housing 201 are glued, welded, or otherwise permanently affixed to one another.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising:
   a housing comprising a conduit having an inlet port; and
   an insert at least partially disposed within the conduit, the insert having a longitudinal axis, wherein the insert comprises:
   a tapered portion extending from a narrower end proximal the inlet port to a wider end distal the inlet port;
   an outlet port located distal the tapered portion;
   a cylindrical portion extending from the tapered portion toward the outlet port;
   one or more surface features extending along an exterior surface of the cylindrical portion; and
   a hollow interior portion connecting an exterior portion of the insert to the outlet port;
   wherein the apparatus is configured to receive a mixed flow of liquid and gas at the inlet port, direct the mixed flow through the conduit along the exterior portion of the insert past the one or more surface features, into and through the hollow interior portion, and outlet the mixed flow at the outlet port; and
   wherein the one or more surface features is configured to regulate and stabilize the mixed flow of liquid and gas; and
   wherein the one or more surface features extend along the longitudinal axis of the insert from the wider end of the tapered portion towards the hollow interior portion and extend along at least 50% of the overall length of the cylindrical portion.

2. The apparatus of claim 1, wherein:
the conduit comprises a tubular passage extending along a longitudinal axis from a proximal end to a distal end;
the inlet port comprises an aperture disposed about the longitudinal axis adjacent the proximal end of the tubular passage; and
the outlet port comprises an aperture oriented transverse to the inlet port and adjacent the distal end of the tubular passage.

3. The apparatus of claim 2, wherein:
the tapered portion of the insert extends along the longitudinal axis of the tubular passage and cooperates with a wall of the passage to form a conical channel between the insert and the wall, and
a cross sectional area transverse the longitudinal axis of the conical channel is smaller than a cross sectional area transverse the longitudinal axis of a portion of the tubular passage adjacent the inlet port.

4. The apparatus of claim 3, further comprising a facility for adjusting a position of the insert within the conduit, wherein the facility is configured to adjust the cross sectional area of the conical channel.

5. The apparatus of claim 3, wherein the tubular passage comprises a tapered wall facing the tapered portion of the insert.

6. The apparatus of claim 1, wherein the one or more surface features is configured to interrupt or divert the mixed flow.

7. The apparatus of claim 6, wherein the one or more surface features is configured to divert at least a portion of the mixed flow towards the outlet port.

8. The apparatus of claim 6, wherein the one or more surface features is configured to reduce the velocity of at least a portion of the mixed flow in regions adjacent the features.

9. The apparatus of claim 6, wherein the surface features comprise a plurality of protrusions extending from a surface of the cylindrical portion.

10. The apparatus of claim 9, wherein at least two of the plurality of protrusions are arranged in a first ring disposed about a longitudinal axis of the insert.

11. The apparatus of claim 10, wherein at least two of the plurality of protrusions are arranged in a second ring disposed about a longitudinal axis of the insert, wherein the protrusions in the first ring are longitudinally offset and radially staggered from the protrusions in the second ring.

12. The apparatus of claim 6, wherein the surface features comprise a plurality of ribs and channels.

13. The apparatus of claim 12, wherein the ribs and channels extend from the wider end of the tapered portion of the insert along the cylindrical portion towards an end of the insert located proximal the outlet port.

14. The apparatus of claim 1, further comprising a facility to adjust the position of the insert within the conduit, wherein the facility comprises a threaded attachment between the housing and insert.

15. The apparatus of claim 1, comprising one or more seals configured to ensure that the conduit is sealed fluid tight except for the inlet and outlet ports.

16. A system comprising:
a carbonator having an outlet for dispensing a flow of carbonated water; and
a flow compensator comprising the apparatus of claim 1;
wherein the outlet of the carbonator is in fluid communication with the inlet port of the flow compensator.

17. The system of claim 16, wherein the flow compensator is configured to decrease the turbulence of the flow of carbonated water dispensed from the carbonator.

18. The system of claim 16, wherein the flow compensator is configured to promote the mixing of carbon dioxide and water in the flow of carbonated water dispensed from the carbonator.

19. The system of claim 16, wherein the carbonator is an inline carbonator.

20. The system of claim 1, wherein the insert further comprises an opening disposed in the cylindrical portion between the exterior portion and the hollow interior portion to fluidly connect the inlet port of the conduit to the outlet port of the insert.

* * * * *